United States Patent
Zhang

(10) Patent No.: US 8,548,789 B2
(45) Date of Patent: Oct. 1, 2013

(54) METHODOLOGY FOR MODELING THE FUEL ROD POWER DISTRIBUTION WITHIN A NUCLEAR REACTOR CORE

(75) Inventor: Baocheng Zhang, Murrysville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 175 days.

(21) Appl. No.: 13/154,509

(22) Filed: Jun. 7, 2011

(65) Prior Publication Data
US 2011/0264426 A1    Oct. 27, 2011

Related U.S. Application Data

(63) Continuation-in-part of application No. 12/029,005, filed on Feb. 11, 2008, now abandoned.

(51) Int. Cl.
     *G06F 17/50*      (2006.01)
(52) U.S. Cl.
     USPC .......... 703/18; 703/2; 703/6; 703/7; 376/245; 376/254; 376/257
(58) Field of Classification Search
None
See application file for complete search history.

(56) References Cited

U.S. PATENT DOCUMENTS

| | | | |
|---|---|---|---|
| 4,297,581 A * | 10/1981 | Brunson et al. | 250/391 |
| 4,774,050 A | 9/1988 | Impink, Jr. | |
| 5,164,895 A * | 11/1992 | Lunz et al. | 700/9 |
| 5,490,184 A | 2/1996 | Heibel | |
| 7,233,888 B2 | 6/2007 | Chiang et al. | |
| 7,428,479 B2 * | 9/2008 | Boer et al. | 703/2 |
| 2004/0009455 A1 | 1/2004 | Chiang et al. | |
| 2004/0096101 A1 * | 5/2004 | Mori et al. | 382/162 |
| 2010/0119026 A1 * | 5/2010 | Gautier et al. | 376/216 |
| 2011/0058636 A1 | 3/2011 | Casal | |

FOREIGN PATENT DOCUMENTS
WO    WO2009/134498 A2    11/2009

OTHER PUBLICATIONS

Zhang et al, "Development of New Pin Power Recovery Methodology", International Conference on Mathematics, Computation Methods & Reactor Physics, May 3-7, 2009.

Iwamoto et al., Dec. 1999, "Pin Power Reconstruction Methods of the Few-Group BWR Core Simulator NEREUS," Journal of Nuclear Science and Technology, vol. 36, No. 12, pp. 1145-1146.

* cited by examiner

*Primary Examiner* — Kamini S Shah
*Assistant Examiner* — Nabil A Adawi, Jr.
(74) *Attorney, Agent, or Firm* — Westinghouse Electric Company LLC; Joseph C. Spadacene

(57) ABSTRACT

A method for modeling a nuclear reactor core that follows the history of each fuel pin and employs fuel pin flux form factors to explicitly track each fuel pin's fluence and burnup along its axial length and uses this information to obtain fundamental data for each fuel rod, i.e. fuel rod cross-sections, for each fuel pin segment. The data obtained for the fuel pins segments are employed to adjust the fuel pin flux form factors to match the real fuel pins' history so that the fuel rod power distribution can be precisely calculated based on the fuel rod cross-sections and the flux form factors.

6 Claims, 6 Drawing Sheets

Average cross-sections (kappa-fission):

| | Energy Group 1 | Energy Group 2 |
|---|---|---|
| | 1.3905 | 30.0125 |
| | 1.4061 | 31.0616 |
| | 1.3993 | 30.8642 |
| | 1.4104 | 31.1022 |

Sample fuel rod cross-sections (kappa-fission) for a single node:

|  | Energy Group 1 | Energy Group 2 |
|---|---|---|
|  | 0 | 0 |
|  | 1.38999 | 30.33812 |
|  | 1.40734 | 28.37248 |
|  | 1.41078 | 26.33429 |
|  | 1.42007 | 34.34342 |
|  | 1.41119 | 32.29242 |
|  | 1.40615 | 32.48921 |

METHODOLOGY FOR MODELING THE FUEL ROD POWER DISTRIBUTION WITHIN A NUCLEAR REACTOR CORE

CROSS REFERENCE TO RELATED APPLICATION

This application is a continuation-in-part of application Ser. No. 12/029,005, now abandoned, filed Feb. 11, 2008.

BACKGROUND OF THE INVENTION

1. Field of the Invention

The present invention relates generally to a method of modeling the power distribution within the core of a nuclear reactor and more particularly to a method for designing initial and reload cores for a nuclear reactor.

2. Description of the Prior Art

The primary side of nuclear reactor power generating systems which are cooled with water under pressure comprises a closed circuit which is isolated and in heat-exchange relationship with a secondary side for the production of useful energy. The primary side comprises the reactor vessel enclosing a core internals structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side. The primary side is also connected to auxiliary circuits, including a circuit for the volumetric and chemical monitoring of the pressurized water. The auxiliary circuit, which is arranged branching from the primary circuit, makes it possible to maintain the quantity of water in the primary circuit by replenishing, when required, with measured quantities of water, and to monitor the chemical properties of the coolant water, particularly its content of boric acid, which is important to the operation of the reactor.

For the purpose of illustration, FIG. 1 shows a simplified nuclear reactor primary system, including a generally cylindrical reactor pressure vessel (10) having a closure head (12) enclosing a nuclear core (14). A liquid reactor coolant, such as water is pumped into the vessel (10) by pump 16 through the core (14) where heat energy is absorbed and is discharged to a heat exchanger (18), typically referred to as a steam generator, in which heat is transferred to a utilization circuit (not shown), such as a steam driven turbine generator. The reactor coolant is then returned to the pump (16), completing the primary loop. Typically, a plurality of the above described loops are connected to a single reactor vessel (10) by reactor coolant piping (20).

An exemplary reactor design is shown in more detail in FIG. 2. In addition to the core (14) comprised of a plurality of parallel, vertical, co-extending fuel assemblies (22), for purposes of this description, the other vessel internal structures can be divided into the lower internals (24) and the upper internals (26). In conventional designs, the lower internals function is to support, align and guide core components and instrumentation, as well as direct flow within the vessel. The upper internals restrain or provide a secondary restraint for the fuel assemblies (22) (only two of which are shown for simplicity in this figure), and support and guide instrumentation and components, such as control rods (28). In the exemplary reactor shown in FIG. 2, coolant enters the reactor vessel (10) through one or more inlet nozzles (30), flows down through an annulus between the vessel and the core barrel (32), is turned 180° in a lower plenum (34), passes upwardly through a lower support plate (37) and a lower core plate (36) upon which the fuel assemblies (22) are seated and through and about the assemblies. In some designs the lower support plate (37) and the lower core plate (36) are replaced by a single structure, the lower core support plate, at the same elevation as (37). The coolant flow through the core and surrounding area (38) is typically large, on the order of 400,000 gallons per minute at a velocity of approximately 20 feet per second. The resulting pressure drop and frictional forces tend to cause the fuel assemblies to rise, which movement is restrained by the upper internals, including a circular upper core plate (40). Coolant exiting the core (14) flows along the underside of the upper core plate and upwardly through a plurality of perforations (42). The coolant then flows upwardly and radially to one or more outlet nozzles (44).

The upper internals (26) can be supported from the vessel or the vessel head and include an upper support assembly (46). Loads are transmitted between the upper support assembly (46) and the upper core plate (40), primarily by a plurality of support columns (48). A support column is aligned above a selected fuel assembly (22) and perforations (42) in the upper core plate (40).

Rectilinearly moveable control rods (28) typically include a drive shaft (50) and a spider assembly (52) of neutron poison rods that are guided through the upper internals (26) and into aligned fuel assemblies (22) by control rod guide tubes (54). The guide tubes are fixedly joined to the upper support assembly (46) and connected by a split pin (56) forced fit into the top of the upper core plate (40). The pin configuration provides for ease of guide tube assembly and replacement if ever necessary and assures that core loads, particularly under seismic or other high loading accident conditions are taken primarily by the support columns (48) and not the guide tubes (54). This assists in retarding guide tube deformation under accident conditions which could detrimentally affect control rod insertion capability.

FIG. 3 is an elevational view, represented in vertically shortened form, of a fuel assembly being generally designated by reference character (22). The fuel assembly (22) is the type used in a pressurized water reactor and has a structural skeleton which, at its lower end includes a bottom nozzle (58). The bottom nozzle (58) supports the fuel assembly (22) on a lower core support plate (36) in the core region of the nuclear reactor. In addition to the bottom nozzle (58), the structural skeleton of the fuel assembly (22) also includes a top nozzle (62) at its upper end and a number of guide tubes or thimbles (54), which extend longitudinally between the bottom and top nozzles (58) and (62) and at opposite ends are rigidly attached thereto.

The fuel assembly (22) further includes a plurality of transverse grids (64) axially-spaced along, and mounted to the guide thimbles (54) and an organized array of elongated fuel rods (66) traversely-spaced and supported by the grids (64). Also, the assembly (22) has an instrumentation tube (68) located in the center thereof and extending between, and mounted to, the bottom and top nozzles (58) and (62). With such an arrangement of parts, fuel assembly (22) forms an integral unit capable of being conveniently handled without damaging the assembly of parts.

As mentioned above, the fuel rods (66) in the array thereof in the assembly (22) are held in spaced relationship with one another by the grids (64) spaced along the fuel assembly length. Each fuel rod (66) includes nuclear fuel pellets (70) and is closed at its opposite ends by upper and lower end plugs (72) and (74). The pellets (70) are maintained in a stack by a plenum spring (76) disposed between the upper end plug (72) and the top of the pellet stack. The fuel pellets (70), composed of fissile material, are responsible for creating the reactive power of the reactor. The fuel pellets (70) within a given fuel rod (66) within an assembly (22) may vary in composition and enrichment from other fuel rods (66) within the same fuel assembly (22). It is important to manage the axial and radial power profile of the core because the power output of the reactor is limited by the hottest temperature experienced along a fuel rod (66). There is a need to keep the operating conditions below that which will result in a departure from nucleate boiling along the cladding of the fuel rod (66). Under that type of condition the heat transfer from the fuel rod (66) to the adjacent coolant deteriorates raising the temperature of the fuel rod which can result in cladding failure. Thus, the placement of the different types of fuel rods within a fuel assembly (22) and the placement of the different types of fuel assemblies within the core (14) is very important to assure safety and maximize the efficiency of the core output. A liquid moderator/coolant such as water or water containing boron, is pumped upwardly through a plurality of flow openings in the lower core support plate (36) to the fuel assembly (22). The bottom nozzle (58) of the fuel assembly (22) passes the coolant upwardly through the guide tubes (54) and along the fuel rods (66) of the assembly in order to extract heat generated therein for the production of useful work.

To control the fission process, a number of control rods (78) are reciprocally moveable in the guide thimbles (54) located at predetermined positions in the fuel assembly (22). Specifically, a rod cluster control mechanism (80) positioned above the top nozzle (62) supports the control rods (78). The control mechanism has an internally threaded cylindrical hub member (82) with a plurality of radially-extending flukes or arms (52). Each arm (52) is interconnected to the control rod (78) such that the control rod mechanism (80) is operable to move the control rods (78) vertically in the guide thimbles (54) to thereby control the fission process in the fuel assembly (22), under the motive power of control rod drive shafts (50) which are coupled to the control rod hubs (80), all in a well known manner.

As previously mentioned, it is important to manage the design of the initial and refueled cores to manage the axial and radial power distribution of the core to assure safety and maximize the efficiency of reactor operation. That means that the kinds of fuel rods (66) within an assembly (22) and the placement of those fuel rods as well as the placement of the assemblies within the core have to be carefully taken into account to minimize the temperature gradient experienced within the core. Presently, core designs are developed using neutron diffusion codes such as ANC, licensable from Westinghouse Electric Company LLC, Pittsburgh, Pa., the assignee of this application. These neutron diffusion codes divide the neutron energy into a few energy ranges (energy groups) and estimate the power distribution from core models. The accuracy of these estimates is not considered high enough due to inherent approximations in the geometric model of the system and the nuclear cross-section databases that they employ. Current reactor core analysis calculations typically use advanced nodal methods which homogenize the fuel pins in a fuel assembly into large nodes (for example, a 17 by 17 fuel rod assembly is transformed into a 2×2 nodal model as shown in FIG. 4. For a nuclear core, containing more than a 100 fuel assemblies, the three-dimensional neutron flux and power distributions are then calculated using the nodal model. Based upon the core-wide nodal power distribution, the assembly fuel pin (i.e. fuel rod) by fuel pin distributions are generated by combining a homogeneous solution with detailed form factors. This works well as long as the operational history can be modeled explicitly in the assembly calculations which generate the homogenized data and form factors. Unfortunately, the real operational history of each fuel assembly is not known in advance, which makes it difficult to generate the right form factors to accurately simulate the core.

Under actual core operating conditions, even for the same type of fuel assembly (22), the heterogeneity, i.e. the point-by-point flux and power distribution, will be changing during operation as a result of the surrounding environment and in particular the control rod insertion and withdrawal history. In order to capture the real history effect on fuel rod pin power, the prior art has tried many kinds of corrections to the pin power form factors with very complicated calculations employed to generate the fuel assembly data. However, the results are still far from satisfactory, especially when control rod or gray rod insertion and withdrawal is commonly experienced during normal power operation. This becomes a big and very difficult issue in the design of BWR cores and new designs of PWR cores, such as the AP1000 currently offered by Westinghouse Electric Company LLC. These problems arise because it is not known in advance when, where, and in which assemblies the control rods will be inserted. The history used to reflect the assembly data generated for the core design may be quite different from the real fuel history experienced in the core during normal operation and this difference is hard to capture in the core design codes using conventional methods.

Accordingly, a new methodology is desired that will better predict the power and flux distribution within the core of a nuclear reactor.

More particularly, a new methodology is desired that will predict the power and flux distribution axially, and radially, over the core taking into account each fuel element.

Furthermore, a new methodology is desired that will better predict the power distribution over a core of a nuclear reactor that more accurately reflects the history of the core.

Additionally, a new methodology is desired that will predict the power distribution within the core of a nuclear reactor without requiring extensive computer processing time or memory.

SUMMARY OF THE INVENTION

In contrast to some conventional methods, the method of this invention will completely do away with the pin power form factors. Instead, the method of this invention follows the exposure history of each fuel rod in the core, and, based on that real history, derives the fuel rod nuclear data, i.e. fuel pin cross-sections in a physics terminology (to represent the probability of neutron reaction such as absorption, fission, etc.). In the actual application, the fuel rod by rod true history is parameterized and represented by its burnup along with the fast fluence. As with most core design codes, these two parameters are calculated (followed) by simply doing a time integration of fuel rod power and local neutron flux followed from manufacture to the current core state. In order to get the fuel pin by pin cross-sections, a reference cross-section table is pre-generated at a pre-defined reactor operating condition, typically the hot full power level condition. For a given actual fuel rod history (burnup and fast fluence), the fuel pin by fuel pin cross sections are derived through looking at the cross-section table and performing a fast fluence correction by comparing actual fluence with the reference one. During generation of the reference pin by pin cross-section table, a reference fuel pin flux form factor table is created as well. The method of this invention uses these pre-generated reference fuel pin flux form factors, in conjunction with the above fuel pin by fuel pin cross sections, to generate the actual pin flux form factors for the given history. The real time adjustment of the fuel pin flux form factors from the reference to the actual value using the fuel pin cross sections is based upon the fundamental theory of reactor physics by the nuclear design codes. Therefore, the fuel pin's history has been taken into account in both fuel pin cross sections and fluxes described above. Multiplying the fuel pin cell kappa-fissions and the fluxes will provide the fuel pin power distribution.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

In most nuclear core design codes, such as ANC, to obtain the pin power distribution of each fuel rod, the fuel pin power form factors are applied to a homogeneous pin power profile over a node to get a pin by pin heterogeneous power distribution for the group of fuel assemblies within the node. It should be appreciated that "fuel rod" and "fuel pin" are used interchangeably in this description. As in many advanced nuclear core design codes, ANC uses energy group dependent form factors. That is, a given set of form factors corresponds to a number of fuel rods within a given energy range. The fuel rod (pin) power of each energy group (g) at (x,y) is expressed as:

$$P_g(x,y) = \kappa \Sigma_{f,g}^{hom}(x,y) \cdot \phi_g^{hom}(x,y) \cdot f_g^P(x,y) = P_g^{hom}(x,y) \cdot f_g^P(x,y) \quad (1)$$

Figure 1:
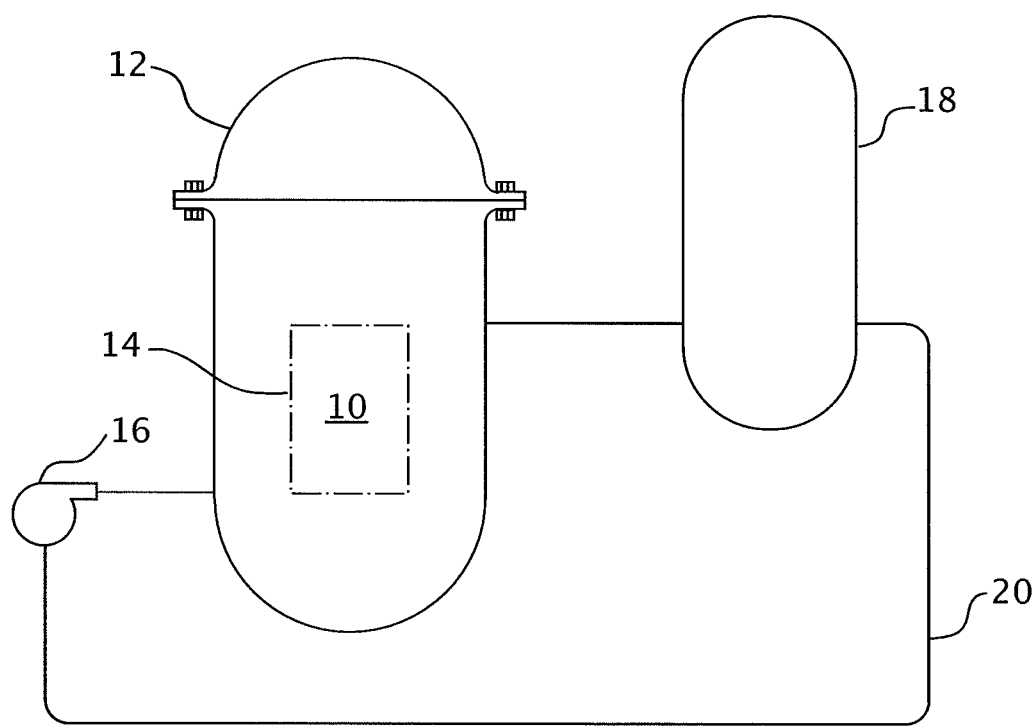
FIG. 1 is a simplified schematic of a nuclear reactor system to which this invention may be applied.
Figure 2:
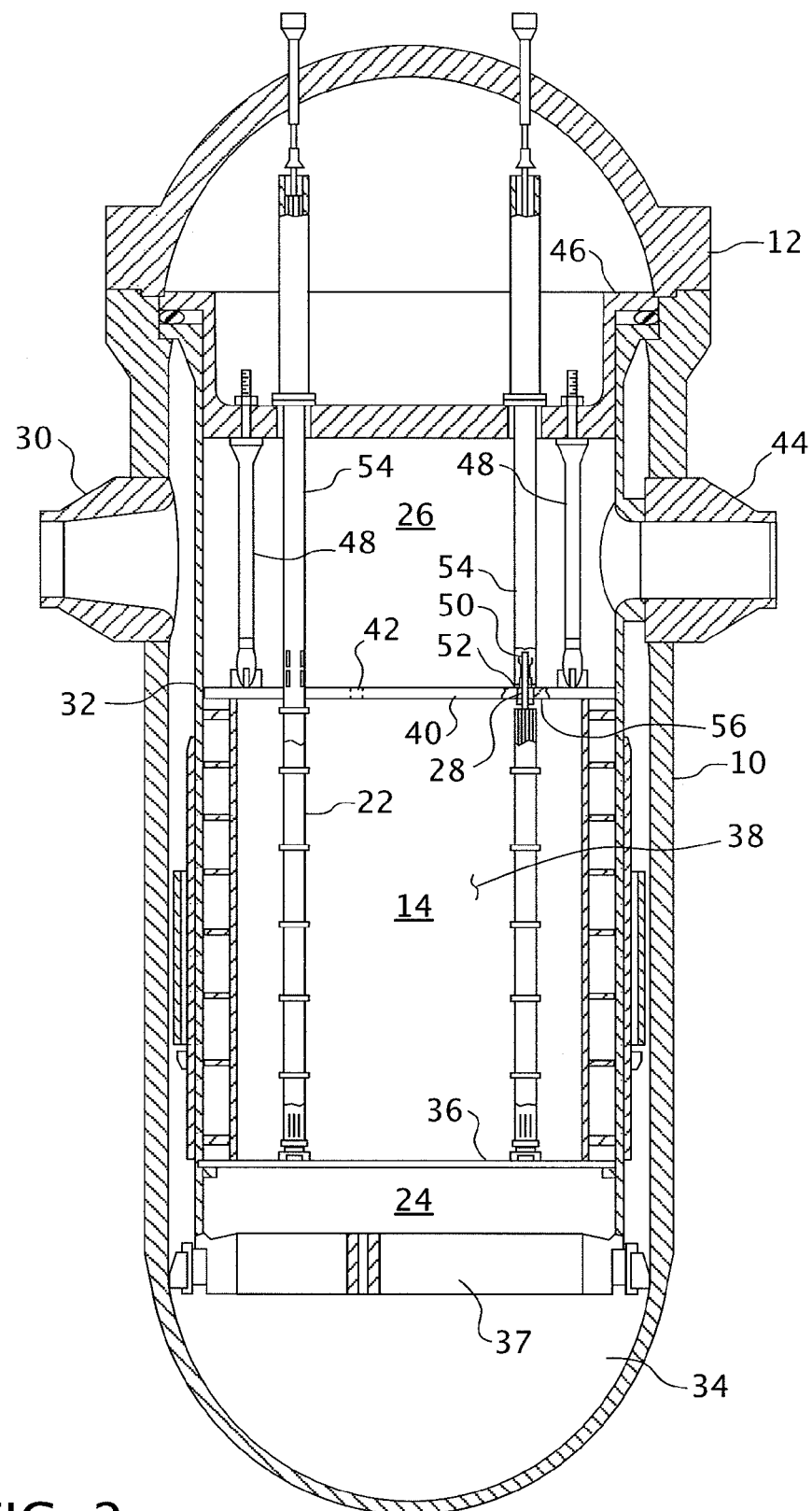
FIG. 2 is an elevational view, partially in section, of a nuclear reactor vessel and internal components to which this invention may be applied.
Figure 3:
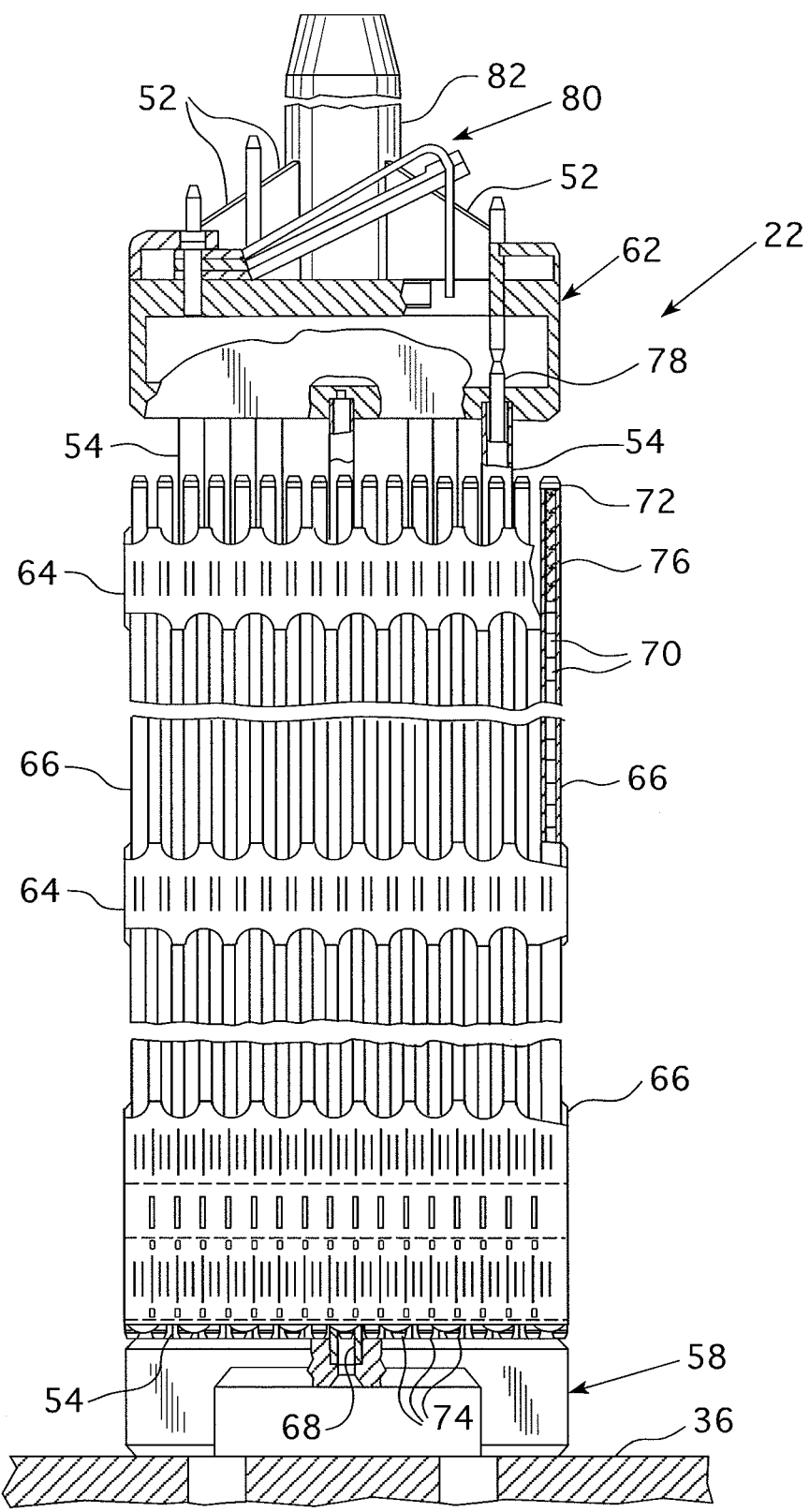
FIG. 3 is an elevational view, partially in section, of a fuel assembly illustrated in vertically shortened form, with parts broken away for clarity.
Figure 4:
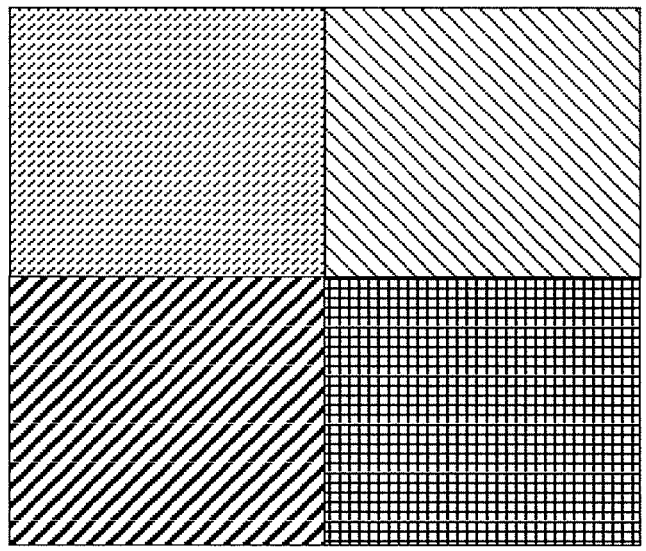
FIG. 4 graphically illustrate a 2×2 nodal model employed by the prior art.

Here (x, y) is the homogeneous pin power, which is obtained from the homogeneous pin-by-pin fluxes and kappa-fissions ($\Lambda\Sigma_f$, i.e. energy release rate from fission). The homogeneous pin fluxes $\phi_g^{hom}(x, y)$ are derived by solving two energy group diffusion equations for each individual node along with the node boundary conditions (node sides' and corners' fluxes). Each node, as illustrated in FIG. 4 is considered as a single homogeneous mass and assumes the power form factors will take care of all the differences among the fuel rods. The kappa-fissions for each of the two energy groups within the node are the average kappa-fissions of each of the fuel assemblies within the corresponding energy group yielding an average value of 1.4061 MeV/cm for Energy Group 1 and 31.0616 MeV/cm for Energy Group 2. The homogeneous pin-by-pin kappa-fissions $\kappa\Sigma_f^{g,hom}(x, y)$ are generated using a polynomial expansion from the conditions of nodal average, sides, and corner cross-sections, rather than the real fuel rod status/history.

The homogeneous kappa-fissions at (x, y) employing this method, do not accurately represent the kappa-fissions of the corresponding fuel rod. The method assumes that the heterogeneity, i.e., the difference among different fuel rods, will be captured by the power form factors $f_g^P(x,y)$, which, as a function of fuel assembly average burnup, are generated in advance through lattice code single-assembly calculations.

Figure 6:
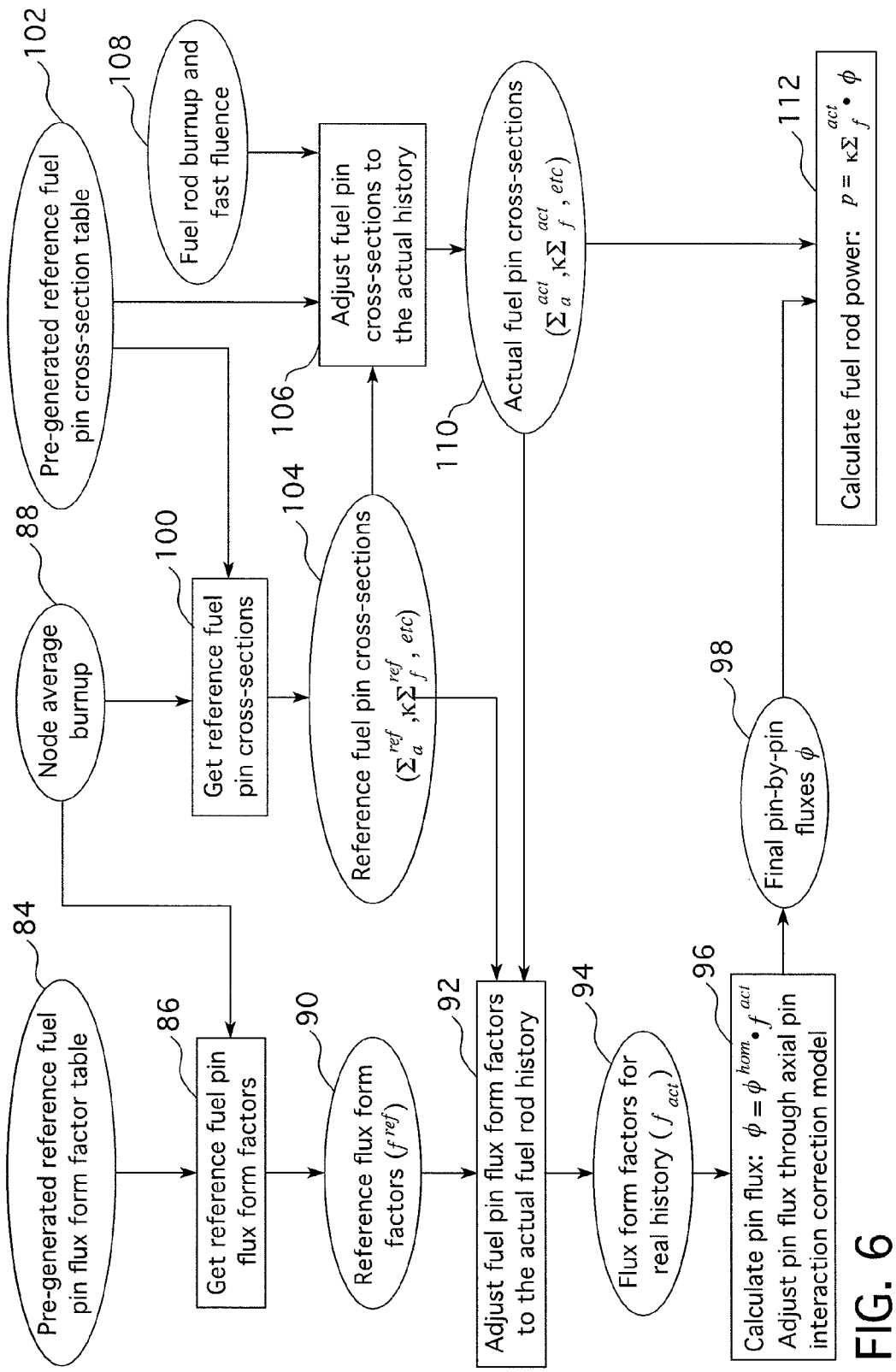
FIG. 6 illustrates a flowchart of the steps of this invention that are sequenced in performing a fuel rod power calculation.

In contrast, the method of this invention directly calculates the fluxes and the neutronic cross-sections (kappa-fissions, absorptions, etc.) for each axial segment of each fuel pin as shown in the flow chart provided in FIG. 6. From pre-generated pin-wise cross-section tables (102), the pin neutronic cross-sections are calculated in two steps. First, based on the local conditions (e.g., temperatures, soluble boron concentration, water densities) and fuel burnup (88), the method calculates (100) each pin neutronic cross-sections (kappa-fissions($\kappa\Sigma_{f,g}^{het,ref}(x, y)$, absorptions $\Sigma_{a,g}^{het,ref}(x, y)$) (104) corresponding to the reference history. Second, according to the difference of actual pin fast fluence ($\Phi(x, y)$) (108) from the reference value, the pin neutronic cross-sections (110) are adjusted (106) as $\kappa\Sigma_{f,g}^{het}(x, y) = \kappa\Sigma_{f,g}^{het,ref}(x, y) \cdot \delta(\Phi(x, y), \Phi^{ref}(x, y))$ to match the actual past history of each fuel pin. No matter how the fuel rod reaches this history point (i.e., whether, when, and how long the control rods are inserted in the fuel), as a result, the history will finally reflect the difference in the burnup and fast fluence of each fuel pin. A key point of this invention is that the pin neutronic cross-sections of each fuel rod always corresponds to its real history since the impact of history on the neutronic cross-sections is covered using burnup and fast fluence of the fuel pin with this invention. The fuel pin power is directly calculated using the pin-by-pin heterogeneous kappa-fissions and fluxes (112) as:

$$P_g(x,y) = \kappa\Sigma_{f,g}^{het}(x,y) \cdot \phi_g^{het}(x,y) = \kappa\Sigma_{f,g}^{het}(x,y) \cdot \phi_g^{hom}(x,y) \cdot f_g^{\Phi}(x,y) \quad (2)$$

Here $f_g^{\Phi}(x, y)$ is the fuel pin flux form factor. Similar to the power form factor, the reference flux form factor, $f_g^{\Phi}(x,y)$ (84) for each pin is generated in advance through lattice code single-assembly calculations under pre-defined conditions, e.g., typically a hot full power condition. A set of fuel burnup steps from fresh (0) to highly burned (for instance 80 MWD/kg) are chosen as the reference history points. At these reference history points, the flux form factors (90) are calculated (86) through a lattice code for each of the fuel segments based on the local temperatures and soluble boron concentration. Exemplary kappa-fissions for sample fuel rod segments in each of the Energy Groups 1 and 2 are shown in the chart below:

| ENERGY GROUP 1 | ENERGY GROUP 2 |
| --- | --- |
| 0 | 0 |
| 1.38999 | 30.33812 |
| 1.40734 | 28.37248 |
| 1.41078 | 26.33429 |
| 1.42007 | 34.3432 |
| 1.41119 | 32.2942 |
| 1.40615 | 32.48921 |

Figure 5:
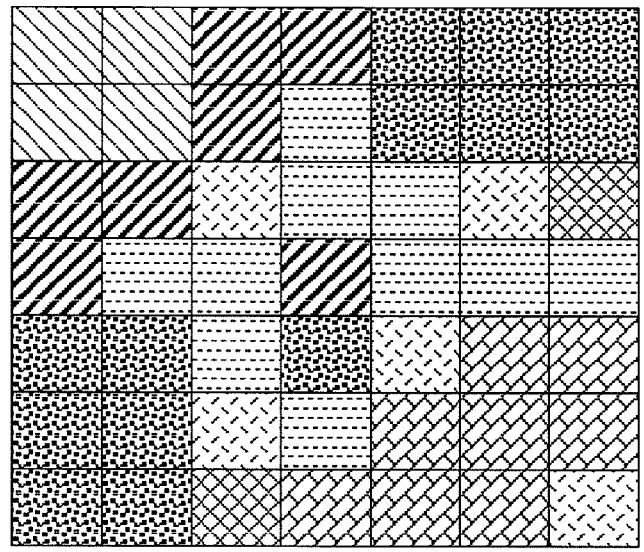
FIG. 5 is a graphical representation of a portion of a fuel assembly illustrating the individual differences in fuel rods taken into account by this invention.

The method of this invention works with each fuel rod as shown in FIG. 5, with the different shades representing the differences between fuel rods, i.e., difference in fuel rod history, e.g. burnup, etc. and difference in type of rod, i.e., composition and enrichment. Thus, the cross-section obtained from Equation 2 represents each fuel rod. Based on the reactor physics theory, the fuel pin flux form factor mainly depends on fuel pin by pin cross-sections. The method of this invention also adopts a correction model to adjust the fuel pin flux form factor (92) from the reference flux form factor obtained from the lattice code single assembly calculation mentioned above, to match the actual fuel pin condition based on the reference and actual cross sections, i.e., (94):

$$f_g^{act}(x, y) = f_g^{ref}(x, y) \cdot F(\Sigma^{ref}, \Sigma^{act}) \quad (3)$$
$$= f_g^{ref}(x, y) \cdot \prod_{g'=1,g} \sqrt{\frac{\Sigma_a^{g',ref} \cdot \Sigma_{g' \to g}^{act}}{\Sigma_a^{g',act} \cdot \Sigma_{g' \to g}^{ref}}}.$$

Here $\Sigma_a^{g'}$ and $\Sigma_{g' \to g}$ stand for absorption and scattering (from energy group g' to g) cross-sections respectively, and "ref" and "act" for reference and actual fuel pin cross-sections. This is a second key point of this invention. With this flux form factor correction model, there is no need to pre-generate large pin form factor table trying to cover all possible control rod insertion scenarios. And the calculated pin flux form factors from Equation 3 always correspond to the actual fuel history of each fuel rod. In addition, since the correction model is derived based on the basic diffusion theory, it works without pre-condition or limits.

The method of the prior art does not take into account the actual history of each individual fuel rod. In other words, it is assumed that the actual heterogeneity of a fuel assembly mainly depends on the assembly average depletion history (burnup) and is less dependent on the path that was taken to obtain that history (how it got there). The prior art fuel pin power method works fine for most PWR's since the above assumption is acceptable for conventional PWR plants that typically run at full power during normal operation and do not actively move gray rods or control rods except for plant shutdown.

The situation is completely different if the control rods are inserted or gray rods are moved during normal plant operation such as occurs in boiling water reactors and new pressurized water reactors such as the AP 1000 design offered by Westinghouse Electric Company LLC. Control rod insertion leads to a significant change in the assembly heterogeneity. This instantaneous impact of control rod insertion can be captured through additional lattice code calculations. But this impact is accumulated with the fuel depletion. The heterogeneity change with control rod insertion during depletion is far different from that without control rod insertion. This creates a big issue for the prior art method since we don't know when, where, and under what conditions the rods need to be inserted into the core and how long they will stay. Efforts have been made by other organizations around world [e.g. Tatsuya IWAMOTO and Munenari YAMAMOTO, Journal of Nuclear Science and Technology, December 1999] to account for the environmental effect on the pin flux or power form factors, especially the control rods insertion history impact. However, all these efforts make an assumption that the impact of control rods insertion induces a smooth pin flux or power form factor change across a fuel assembly. Therefore, all these developed methods may work in the certain range of fuel history, but only for a BWR (boiling water reactor) since the control rods (actually control blades) are inserted outside of the fuel assembly, while PWR (pressurized water reactor) control rods (containing up to 24 fingers) are inserted among the fuel rods within a fuel assembly. This issue is not as big a problem when the fuel pin cross-sections are taken on an individual pin basis in accordance with the method of this invention.

In order to improve the results of the prior art method, a wide range of studies have been carried out. The approaches taken have generated fuel pin power form factors for many different control rod histories under different conditions and tabulated them. Even adding a large amount of lattice code calculations, the prior art method still cannot give a satisfactory model that will predict an accurate core power distribution profile for all conditions. This is because the pin power form factor used in the calculations doesn't represent the real heterogeneity of the fuel assembly.

The method of this invention directly deals with each individual fuel rod (pin). Instead of the assembly average burnup, the method of this invention uses fuel rod burnup and spectrum history (fluence, the time integration of fast neutron level) which are calculated/accumulated over the history from manufacture to the current state to get the fuel rod cross-sections. These two parameters of each fuel rod define not only the fuel rod's current state but also reflect the path of the history. No matter how complicated the fuel assembly history is, the method of this invention is always able to calculate the fuel rod cross-sections (e.g. $\Sigma_a$ fuel rod absorption cross-section, $\kappa\Sigma_f$ fuel rod fission energy release cross-section) based on these two parameters and make the fuel rod cross-sections match the real heterogeneity of the fuel assembly since it follows the history of each fuel rod through tracking the above two parameters. Furthermore, through the correction of Equation 3, the fuel pin flux form factors correspond to the real assembly heterogeneity. Therefore, the method of this invention automatically captures the history of the fuel assembly and each individual fuel rod in time.

In addition, the control rods insertion creates a significant heterogeneity difference around the control rod tip between the axial levels with and without control rods. This strong heterogeneity affects the pin power and neutron flux re-distribution due to the interaction of the fuel rods between the axial levels. However, this effect has been ignored by prior art methods. Since the neutron flux continuity and the pin fluxes for each axial level are considered by this invention, a pin-wise axial interaction correction model is developed and the pin neutron fluxes are adjusted to take into account the interaction between the axial fuel levels (96). This pin axial interaction correction model improves the pin flux (98)/power prediction not only for a control rod inserted fuel assembly but also for any fuel assembly designed with a strong axial heterogeneity change, such as most BWR fuel assemblies.

The method of this invention doesn't need to perform different and complicated history calculations during fuel assembly data generation. The method of this invention follows the fuel pin true history over time and calculates the pin cell data (data over the incremental cross-sections) directly based on the fuel pins real history. Therefore, the method of this invention will be able to handle all kinds of control rod and discreet burnable absorber insertion and withdrawal scenarios.

Unlike the full fuel pin by fuel pin calculations currently being studied in many national labs and universities, the method of this invention won't directly solve diffusion or transport equations for each pin (NGM-Next Generation Method). Instead, it adopts a 1.5-group-like method to simply adjust the pin-by-pin fluxes. Since there is no need for iteration and pin-by-pin coupling, this method is much faster than NGM while the transport results are well reproduced. The method of this invention requires very little computer processing unit time increase compared to the prior art method.

In addition, the pin history data (burnup and fluence) are available in most design codes (for example, ANC). Therefore, there is no need to save any additional individual pin data. Individual fuel pin information is a large chunk of data. Saving any additional individual pin data will significantly increase the disk requirements and impact code performance which has been one of the biggest problems for NGM.

As described above, the method of this invention will improve the prediction of pin power for any kind of history of control rod or discreet burnable absorber insertion or withdrawal. In addition, the method of this invention calculates individual cross-sections and fluxes that are needed for re-homogenization. That means that if this method is applied one is able to do re-homogenization in a very inexpensive and efficient way. Re-homogenization can be used to directly solve many of the outstanding core problems such as assembly bow, MOX/UO$_2$ core analysis, power mis-estimation for peripheral assemblies in the core, etc.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalence thereof.

What is claimed is:

1. A method of modeling an axial and radial fuel rod by fuel rod power distribution of a nuclear fuel assembly by determining a neutronic cross section for each fuel rod within the fuel assembly individually over a number of axial increments, comprising the steps of:
   a) defining 2×2 radial nodes per assembly for each of the axial increments and calculating a three dimensional node average and surface flux distribution for each 2×2 node;
   b) calculating a reference kappa-fission, absorption, and neutron flux form factors for each fuel rod based on a number of reference values and local conditions based upon a reference history;
   c) calculating actual pin neutronic cross-sections (taking into account kappa-fission and absorption) for each of the axial increments by applying a fuel rod fast fluence correction to the results obtained in step b), and adjusting the fuel rod flux form factors using the following equation:

$$f_g^{act}(x,y) = f_g^{ref}(x,y) \cdot \prod_{g'=1,g} \sqrt{\frac{\Sigma_a^{g',ref} \cdot \Sigma_{g' \to g}^{act}}{\Sigma_a^{g',act} \cdot \Sigma_{g' \to g}^{ref}}} \ ;$$

wherein
   $f_g^{ref}(x,y)$ is the reference neutron flux form factor of a fuel rod at location (x, y) for energy group "g", pre-generated at hot full power condition, $\Sigma_a^{g,ref}$ and $\Sigma_a^{g,act}$ are respectively the reference and actual absorption cross-sections of the fuel rod for energy group "g", while $\Sigma_{g' \to g}^{ref}$ and $\Sigma_{g' \to g}^{act}$ are the neutron scattering cross-sections from energy group "g'" to "g", according to a pin neutronic cross-section change so that both pin neutronic cross-sections and pin flux form factors correspond to an actual fuel rod and fuel assembly history;
   d) generating homogeneous neutron flux values for an adjacent group of fuel rods in the fuel assembly;
   e) calculating a number of heterogeneous neutron fluxes of each of the adjacent group of fuel rods respectively from the homogeneous neutron flux values obtained in step d) and the neutron flux form factors;
   f) using a fuel rod axial interaction correction model to adjust the heterogeneous neutron fluxes to take into account an axial interaction of each fuel rod between different axial levels; and
   g) determining the power for each fuel rod from a constant times the sum of a product of the calculated kappa-fissions and the heterogeneous neutron fluxes over a number of energy groups.

2. The method of claim 1 wherein the neutron flux form factor is a function of the composition and enrichment of the fuel rod.

3. The method of claim 1 wherein each of the flux form factors initially determined for each fuel rod to simulate the fuel rods history is a reference flux form factor, which does not directly take into account the in-core placement history of the fuel assembly.

4. The method of claim 3 including the step of adjusting the reference flux form factors to take into account the affect on fuel rod from the actual history of control rod insertion into the fuel assembly.

5. The method of claim 4 wherein the control rods are inserted within the fuel assembly for a preselected percentage of an operating cycle of the fuel assembly.

6. The method of claim 3 wherein the adjustment to the flux form factor reflects the fuel assemblies previous history including placement, local power and burnup experienced by each fuel assembly over previous loading cycles within the core.

* * * * *